(12) United States Patent
Reich

(10) Patent No.: US 7,228,634 B1
(45) Date of Patent: Jun. 12, 2007

(54) USING VIEWING-ANGLE-SENSITIVE VISUAL TAGS TO DETERMINE ANGULAR ORIENTATION AND/OR LOCATION

(75) Inventor: James E. Reich, San Francisco, CA (US)

(73) Assignee: Palo Alto Research Center Inc., Palo Alto, CA (US)

( * ) Notice: Subject to any disclaimer, the term of this patent is extended or adjusted under 35 U.S.C. 154(b) by 0 days.

(21) Appl. No.: 11/312,826

(22) Filed: Dec. 19, 2005

(51) Int. Cl.
*G01C 1/00* (2006.01)
*G01B 11/26* (2006.01)

(52) U.S. Cl. .................. 33/276; 356/138; 356/622

(58) Field of Classification Search ............ 33/276, 33/1 G, 1 N, 1 L, 1 CC, 277; 356/138, 622
See application file for complete search history.

(56) References Cited

U.S. PATENT DOCUMENTS

| | | | | |
|---|---|---|---|---|
| 3,914,742 A * | 10/1975 | Munster et al. ............ 382/210 |
| 5,289,264 A * | 2/1994 | Steinbichler ............... 356/605 |
| 5,732,473 A * | 3/1998 | Gagnon ..................... 33/270 |
| 6,785,972 B2 * | 9/2004 | Goldberg .................... 33/1 K |
| 6,819,409 B1 * | 11/2004 | Tompkin et al. ............ 356/71 |
| 6,961,174 B1 * | 11/2005 | Weidmann et al. ......... 359/436 |
| 7,107,693 B2 * | 9/2006 | Nesch et al. ................ 33/1 N |
| 7,123,354 B2 * | 10/2006 | Burgschat et al. ..... 356/139.03 |
| 2004/0035012 A1 * | 2/2004 | Moehnke et al. ........... 33/494 |
| 2005/0124870 A1 * | 6/2005 | Lipson ...................... 600/316 |
| 2006/0209292 A1 * | 9/2006 | Dowski et al. ............ 356/121 |

* cited by examiner

*Primary Examiner*—Christopher W. Fulton
(74) *Attorney, Agent, or Firm*—Park, Vaughan & Fleming LLP

(57) ABSTRACT

One embodiment of the present invention provides a system that uses a visual tag to determine an angle. During operation, the system observes the visual tag from an observation point, wherein the visual tag includes an angle-sensitive image which changes in appearance when observed from different angles. Next, the system uses the appearance of the angle-sensitive image (as observed from the observation point) to determine the angle between the visual tag and the observation point. In a variation on this embodiment, the system uses the determined angle along with supplemental information to determine the physical location of the observation point.

29 Claims, 3 Drawing Sheets

USING VIEWING-ANGLE-SENSITIVE VISUAL TAGS TO DETERMINE ANGULAR ORIENTATION AND/OR LOCATION

BACKGROUND

1. Field of the Invention

The present invention relates to techniques for using viewing-angle-sensitive visual tags to determine the angular orientation and/or physical location of an object.

2. Related Art

Recent technological developments have made Global Positioning System (GPS) transceivers significantly cheaper and more portable. This has led to a proliferation of devices that use such GPS transceivers to determine physical location. For example, such devices include automobile navigation systems and GPS-enabled running watches.

Unfortunately, because of attenuation problems for GPS signals within buildings, these GPS-enabled devices are typically ineffective at determining physical locations inside buildings. Physical locations inside of a building can be determined by placing radio-frequency "beacon nodes" throughout the building. However, such beacon nodes are relatively complicated and expensive to deploy. Furthermore, these beacon nodes are likely to include batteries, which creates maintenance problems because the batteries need to be replaced at regular intervals.

It is also possible to use existing WiFi access points to determine the physical locations of objects inside a building based on the attenuation characteristics of WiFi signals within the building. However, determining locations in this way is not very accurate and requires potentially significant amounts of calibration effort. Furthermore, if furniture, access points, or even people move within a building, the system may require recalibration to effectively determine locations.

Another shortcoming of GPS systems is that they are not able to determine the angular orientations of objects. Such angular-orientation information can be useful in determining, for example, which direction a camera is pointing, or which direction an object is facing.

Hence, what is needed is a method and an apparatus for determining physical locations and/or angular orientations of objects without the limitations of the above-described techniques.

SUMMARY

One embodiment of the present invention provides a system that uses a visual tag to determine an angle. During operation, the system observes the visual tag from an observation point, wherein the visual tag includes an angle-sensitive image which changes in appearance when observed from different angles. Next, the system uses the appearance of the angle-sensitive image (as observed from the observation point) to determine the angle between the visual tag and the observation point.

In a variation on this embodiment, the system uses the determined angle along with supplemental information to determine the physical location of the observation point.

In a further variation, the system obtains the supplemental information by, observing one or more additional visual tags from the observation point. The system then uses the appearance of angle-sensitive images in the additional visual tag(s) to determine an "additional angle" (or angles) between the additional visual tag(s) and the observation point. The system then uses this additional angle while determining the physical location of the observation point. One additional observation will allow measurement of position in two dimensions, while a third observation set at 90 degrees to the other two will allow measurement of three-dimensional position.

In a variation on this embodiment, the visual tag includes visible location information which indicates the physical location of the visual tag.

In a further variation, determining the physical location of the observation point involves using the visible location information and the appearance of the angle-sensitive image, along with the supplemental information (which partially constrains the location of the observation point) to determine the physical location of the observation point without requiring calibration or communication with an outside source.

In a variation on this embodiment, the visual tag includes a visible "tag identifier." This allows a database lookup to be performed based on the tag identifier to return information associated with the tag.

In a variation on this embodiment, the angle-sensitive image includes a lenticular lens, which includes an array of optical elements (lenticules) which are configured so that when the lens is viewed from different angles, different areas under the lens are magnified.

In a variation on this embodiment, the angle-sensitive image includes a hologram, which presents differing images when viewed from different angles.

In a variation on this embodiment, the visual tag is affixed to a rotatable object. In this embodiment, the system uses the determined angle between the observation point and the visual tag to determine an angle of rotation for the rotatable object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Determining Physical Location and Angular Orientation

As is described above, one embodiment of the present invention uses observations of viewing-angle-sensitive visual tags to determine the physical location of a viewer (located at an observation point) relative to the viewing-angle-sensitive visual tags.

In a closely related problem, knowing the direction from a fixed location to a viewer (or the direction from an object to a viewer in the object's frame of reference) is difficult without first determining the orientation of the viewer in an absolute frame of reference. Determining the bearing from a fixed tag to the viewer currently involves calibrating a camera's optical system to determine the mapping from pixel positions to angles. Furthermore, determining this bearing in a global coordinate system requires that the camera's orientation must be known in the global coordinate system. Determining the camera's orientation requires accurate real-time orientation measurements, which are often difficult to obtain. Furthermore, this technique requires that the camera be in communication with some type of remote data store which provides the location information for a given tag.

As is described below, one embodiment of the present invention uses viewing-angle-sensitive visual tags to efficiently solve the above-described problems.

Angle-Sensitive Visual Tag

Figure 1:
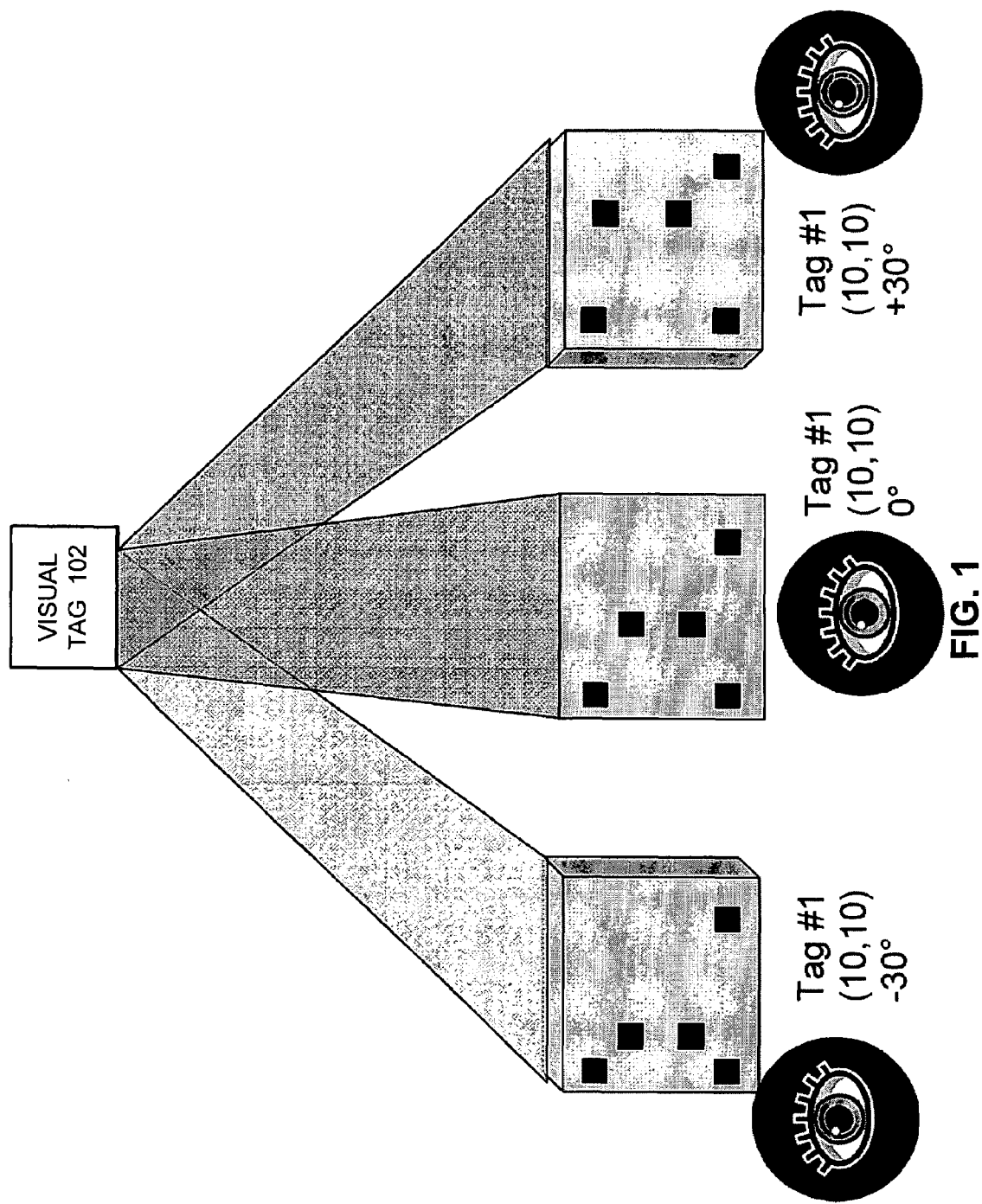
FIG. 1 illustrates a viewing-angle-sensitive visual tag in accordance with an embodiment of the present invention.

FIG. 1 illustrates a viewing-angle-sensitive visual tag 102 in accordance with an embodiment of the present invention. By using a hologram or a lenticular lens system, visual tag 102 can be fabricated with an appearance that varies according to direction to the viewer in the frame of reference of the visual tag. For example, the visual tag 102 illustrated in FIG. 2 has an identifiably different appearance (summarized as an ID code) for each angular range in set of angular ranges. Thus, by determining which ID code a tag is displaying, the tag's angular orientation relative to the viewer, or the bearing from the tag to the user in the tag's frame of reference (these are equivalent) can be known.

Note that at the time of installation of a tag, it may be easier to map the (static) tag's location in a global coordinate system and then store that result in the information displayed on the tag, thereby obviating the need for communications and camera position measurements to determine the tag's location.

A visual tag, which includes a hologram or an image behind a lenticular lens array, allows different discrete images of an object to appear to a viewer, depending on the relative angle between the viewer and the tag. Normally, these technologies are used to display three-dimensional images. However, instead of displaying three-dimensional images, one embodiment of the present invention uses these technologies to display a discrete code at each angle. This code may simply be an identifier which is used to look up: the identity of the tag, the position of the tag, and the angular orientation of the tag. Alternatively, this code can directly encode the tag's identity, physical location and angular orientation in a common coordinate system, as well as the angle from the tag to the viewer.

For example, FIG. 1 illustrates how visual tag 102 displays a different pattern from each of three different viewing angles. This pattern encodes: the tag's identifier (Tag #1), the tag's location (10,10) and the angle from the tag to the viewer (−30°).

One embodiment of the present invention uses tags which are sensitive to multiple wavelengths of light, including wavelengths not visible to the human eye to allow for "invisible" tagging.

Location Determination from Two Angle-Sensitive Visual Tags

Figure 2:
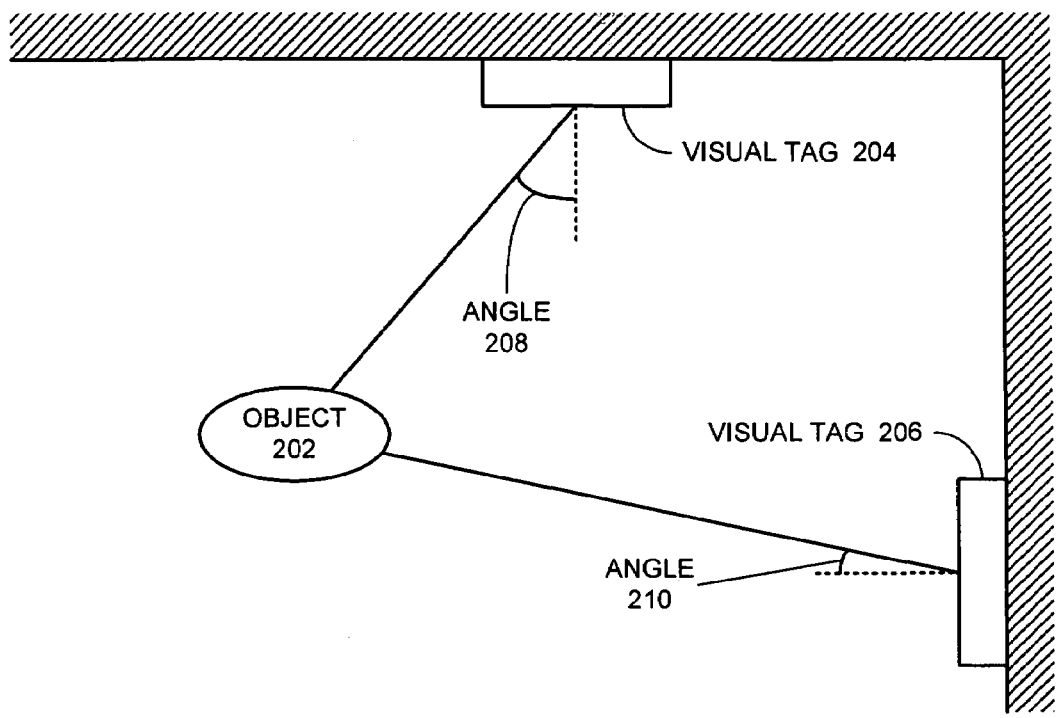
FIG. 2 illustrates how observations of two viewing-angle-sensitive visual tags are used to determine the physical location of an object in accordance with an embodiment of the present invention.

FIG. 2 illustrates how observations of two viewing-angle-sensitive visual tags 204 and 206 are used to determine the physical location of an object 202 in accordance with an embodiment of the present invention. In this example, the object 202 (which includes a visual sensor such as a camera) observes two visual tags 204 and 206. The appearance of visual tag 204 (as observed from object 202) allows the system determine the angle 208 from object 202 to visual tag 204 in the frame of reference of visual tag 204. Similarly, the appearance of visual tag 206 allows the system to determine the angle 210 from object 202 to visual tag 206 in the frame reference of visual tag 206.

Using well-known triangulation techniques, the angles 208 and 210 along with location and angular-orientation information for visual tags 204 and 206, can be used to determine the physical location of object 202. This process is described in more detail below with reference to the flow chart in FIG. 5.

Location Determination from a Single Angle-Sensitive Visual Tag

Figure 3:
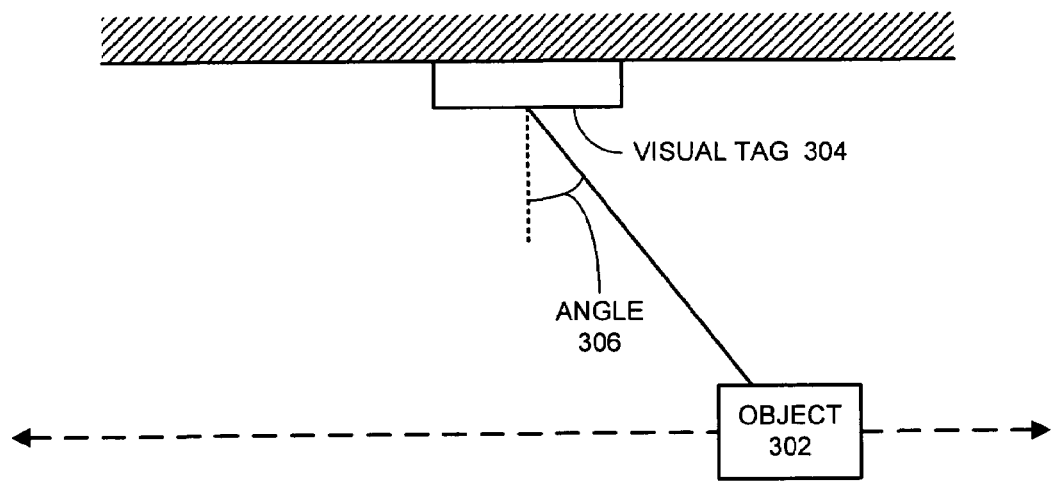
FIG. 3 illustrates how observations of a single viewing-angle-sensitive visual tag are used to determine the physical location of an object in accordance with an embodiment of the present invention.

FIG. 3 illustrates how observations of a single viewing-angle-sensitive visual tag 304 are used to determine the physical location of an object 302 in accordance with an embodiment of the present invention. In this example, the object 302 is constrained to move along the fixed path represented by the dashed arrows in FIG. 3. For example, the fixed path might be a walkway through a building.

In this example, a visual sensor within object 302 observes a single visual tag 304. The appearance of visual tag 304 (as observed from object 302) allows the system determine an angle 306 from object 302 to visual tag 304 in the frame of reference of visual tag 304.

Using well-known triangulation techniques, the physical location of object 302 is determined by considering: location of the path indicated by the dashed arrows, the angle 306, and location and angular-orientation information for visual tag 304.

Angular Orientation Determination

Figure 4:
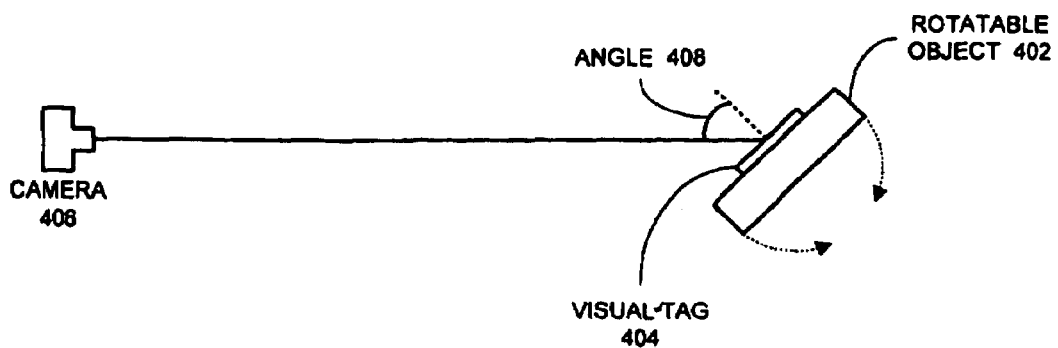
FIG. 4 illustrates how observations of a single viewing-angle-sensitive visual tag are used to determine the angular orientation of a rotatable object in accordance with an embodiment of the present invention.

FIG. 4 illustrates how observations of a single viewing-angle-sensitive visual tag 404 are used to determine the angular orientation of a rotatable object in accordance with an embodiment of the present invention. In this example, a fixed camera 406 observes a visual tag 404, which is attached to a rotating object 402. For example, the rotating object 402 can be: a camera, a directional microphone, or a door.

The appearance of visual tag 404 (as observed from camera 406) is used by the system to determine the angle 408 from camera 406 to visual tag 404 in the frame of reference of visual tag 404. This angle 408 can then be used to determine the angular orientation of rotatable object 402.

Process of Determining Location from Two Angle-Sensitive Visual Tags

Figure 5:
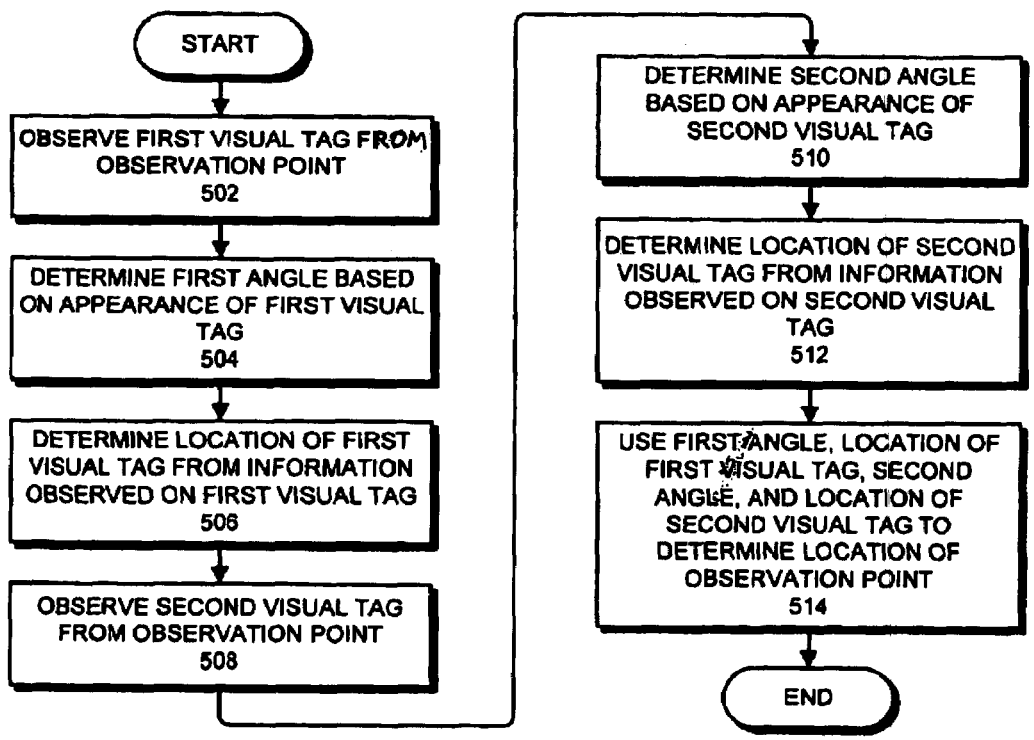
FIG. 5 presents a flow chart illustrating the process of determining the physical location of an object by observing two viewing-angle-sensitive visual tags in accordance with an embodiment of the present invention.

FIG. 5 presents a flow chart illustrating the process of determining the physical location of an object by observing two viewing-angle-sensitive visual tags in accordance with an embodiment of the present invention. At the beginning of this process, the system observes a "first visual tag" from an observation point (step 502). Next, the system uses the appearance of the first visual tag (as observed from the observation point) to determine a "first angle" from the observation point to the first visual tag in the frame of reference of the first visual tag (step 504). The system also determines the location of the first visual tag from information contained within the first visual tag (step 506). As mentioned above, this can involve obtaining the location information directly from the pattern presented by the first visual tag, or alternatively, by obtaining a tag identifier from the pattern presented by the first visual tag, and then using this tag identifier to look up location and orientation information for the first visual tag in a remote data store.

The system also observes a "second visual tag" from the observation point (step 508), and similarly uses the appearance of the second visual tag (as observed from the observation point) to determine a "second angle" from the observation point to the second visual tag in the frame of reference of the second visual tag (step 510). The system also determines a location of the second visual tag from information contained within the second visual tag using the above-described techniques (step 512).

Finally, the system uses any one of a number of well-known triangulation techniques to determine the physical location of the observation point. In doing so, the system takes into account: the first angle, the location and orientation of the first visual tag, the second angle, and the location and orientation of the second visual tag (step 514).

Note that a third visual tag can be used to determine the physical location of the object in three dimensions. More specifically, the system can observe the third visual tag from the observation point, wherein the observation of the third visual tag is orthogonal to the observations of the first visual tag and the second visual tag. The system can then use the appearance of an angle-sensitive image in the third visual tag to determine a "third angle" between the third visual tag and the observation point. The system can then determine the physical location of the observation point in three dimensions by using well-known triangulation techniques based on the first angle, the second angle and the third angle.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a visual tag that includes an angle-sensitive image to determine an angle, the method comprising:
    observing the visual tag which includes the angle-sensitive image, wherein the visual tag is observed from an observation point;
    wherein the angle-sensitive image changes in appearance when observed from different angles; and
    using the appearance of the angle-sensitive image as observed from the observation point to determine a first angle between the visual tag and the observation point.

2. The method of claim 1, further comprising using the first angle along with supplemental information to determine a physical location of the observation point.

3. The method of claim 2,
    wherein the method further comprises obtaining the supplemental information by, observing a second visual tag from the observation point, and using the appearance of an angle-sensitive image in the second visual tag to determine a "second angle" between the second visual tag and the observation point; and
    wherein determining the physical location of the observation point involves using the first angle and the second angle to determine the physical location of the observation point in two dimensions.

4. The method of claim 3,
    wherein obtaining the supplemental information also involves,
        observing a third visual tag from the observation point,
        wherein the observation of the third visual tag is orthogonal to the observations of the first visual tag and the second visual tag, and
        using the appearance of an angle-sensitive image in the third visual tag to determine a "third angle" between the third visual tag and the observation point; and
    wherein determining the physical location of the observation point involves using the first angle, the second angle and the third angle to determine the physical location of the observation point in three dimensions.

5. The method of claim 1, wherein the visual tag includes visible location information which indicates the physical location of the visual tag.

6. The method of claim 5, wherein determining the physical location of the observation point involves using the visible location information and the appearance of the angle-sensitive image, along with the supplemental information, which partially constrains the physical location of the observation point, to determine the physical location of the observation point without requiring calibration or communication with an outside source.

7. The method of claim 1, wherein the visual tag includes a visible "tag identifier," which can be used to lookup information associated with the visual tag.

8. The method of claim 1, wherein the angle-sensitive image includes a lenticular lens, which includes an array of optical elements (lenticules) which are configured so that when the lens is viewed from different angles, different areas under the lens are magnified.

9. The method of claim 1, wherein the angle-sensitive image includes a hologram, which presents differing images when viewed from different angles.

10. The method of claim 1,
    wherein the visual tag is affixed to a rotatable object; and
    wherein the method further comprises using the first angle between the observation point and the visual tag to determine an angle of rotation for the rotatable object.

11. The apparatus of claim 1, wherein the visual tag includes a visible "tag identifier," which can be used to lookup information associated with the visual tag.

12. The apparatus of claim 1, wherein the angle-sensitive image includes a lenticular lens, which includes an array of optical elements (lenticules) which are configured so that when the lens is viewed from different angles, different areas under the lens are magnified.

13. The apparatus of claim 1, wherein the angle-sensitive image includes a hologram, which presents differing images when viewed from different angles.

14. A computer-readable storage medium storing instructions that when executed by a computer cause the computer to perform a method for using a visual tag that includes an angle-sensitive image to determine an angle, the method comprising:
   observing the visual tag which includes the angle-sensitive image, wherein the visual tag is observed from an observation point;
   wherein the angle-sensitive image changes in appearance when observed from different angles; and
   using the appearance of the angle-sensitive image as observed from the observation point to determine the angle between the visual tag and the observation point.

15. The computer-readable storage medium of claim 14, wherein the method further comprises using the first angle along with supplemental information to determine a physical location of the observation point.

16. The computer-readable storage medium of claim 14,
   wherein the method further comprises obtaining the supplemental information by, observing a second visual tag from the observation point, and using the appearance of an angle-sensitive image in the second visual tag to determine a "second angle" between the second visual tag and the observation point; and
   wherein determining the physical location of the observation point involves using the first angle and the second angle to determine the physical location of the observation point in two dimensions.

17. The computer-readable storage medium of claim 16, wherein obtaining the supplemental information also involves,
   observing a third visual tag from the observation point, wherein the observation of the third visual tag is orthogonal to the observations of the first visual tag and the second visual tag, and
   using the appearance of an angle-sensitive image in the third visual tag to determine a "third angle" between the third visual tag and the observation point; and
   wherein determining the physical location of the observation point involves using the first angle, the second angle and the third angle to determine the physical location of the observation point in three dimensions.

18. The computer-readable storage medium of claim 14, wherein the visual tag includes visible location information which indicates the physical location of the visual tag.

19. The computer-readable storage medium of claim 18, wherein determining the physical location of the observation point involves using the visible location information and the appearance of the angle-sensitive image, along with the supplemental information, which partially constrains the physical location of the observation point, to determine the physical location of the observation point without requiring calibration or communication with an outside source.

20. The computer-readable storage medium of claim 14, wherein the visual tag includes a visible "tag identifier," which can be used to lookup information associated with the visual tag.

21. The computer-readable storage medium of claim 14, wherein the angle-sensitive image includes a lenticular lens, which includes an array of optical elements (lenticules) which are configured so that when the lens is viewed from different angles, different areas under the lens are magnified.

22. The computer-readable storage medium of claim 14, wherein the angle-sensitive image includes a hologram, which presents differing images when viewed from different angles.

23. The computer-readable storage medium of claim 14,
   wherein the visual tag is affixed to a rotatable object; and
   wherein the method further comprises using the first angle between the observation point and the visual tag to determine an angle of rotation for the rotatable object.

24. An apparatus that uses a visual tag that includes an angle-sensitive image to determine an angle, comprising:
   an observation mechanism configured to observe the visual tag which includes the angle-sensitive image, wherein the visual tag is observed from an observation point;
   wherein the angle-sensitive image changes in appearance when observed from different angles; and
   a processing mechanism configured to use the appearance of the angle-sensitive image as observed from the observation point to determine the angle between the visual tag and the observation point.

25. The apparatus of claim 24, wherein the processing mechanism is additionally configured to use the first angle along with supplemental information to determine a physical location of the observation point.

26. The apparatus of claim 25,
   wherein the observation mechanism is additionally configured to obtain the supplemental information by, observing a second visual tag from the observation point; and
   wherein the processing mechanism is additionally configured to use the appearance of an angle-sensitive image in the second visual tag to determine a "second angle" between the second visual tag and the observation point; and
   wherein the processing mechanism is configured to use the first angle and the second angle to determine the physical location of the observation point in two dimensions.

27. The apparatus of claim 26,
   wherein the observation mechanism is additionally configured to obtain the supplemental information by observing a third visual tag from the observation point, wherein the observation of the third visual tag is orthogonal to the observations of the first visual tag and the second visual tag, and
   wherein the processing mechanism is additionally configured to use the appearance of an angle-sensitive image in the third visual tag to determine a "third angle" between the third visual tag and the observation point; and
   wherein the processing mechanism is configured to use the first angle, the second angle and the third angle to determine the physical location of the observation point in three dimensions.

28. The apparatus of claim 26, wherein while determining the physical location of the observation point, the processing mechanism is configured to use the visible location information and the appearance of the angle-sensitive image, along with the supplemental information, which partially constrains the physical location of the observation point, to determine the physical location of the observation point without requiring calibration or communication with an outside source.

29. The apparatus of claim 24, wherein the visual tag includes visible location information which indicates the physical location of the visual tag.

* * * * *

UNITED STATES PATENT AND TRADEMARK OFFICE
CERTIFICATE OF CORRECTION

PATENT NO. : 7,228,634 B1  
APPLICATION NO. : 11/312826  
DATED : June 12, 2007  
INVENTOR(S) : James E. Reich Page 1 of 1

It is certified that error appears in the above-identified patent and that said Letters Patent is hereby corrected as shown below:

On the title page, item [73]:

In the Assignee Name please delete "Palo Alto Research Center Inc.".

In the Assignee Name please insert --Palo Alto Research Center Incorporated--.

Signed and Sealed this

Nineteenth Day of August, 2008

JON W. DUDAS  
*Director of the United States Patent and Trademark Office*